United States Patent [19]
Stam et al.

[11] Patent Number: 6,008,486
[45] Date of Patent: Dec. 28, 1999

[54] WIDE DYNAMIC RANGE OPTICAL SENSOR

[75] Inventors: Joseph S. Stam; Jon H. Bechtel, both of Holland, Mich.; Eric R. Fossum; Sabrina E. Kemeny, both of La Crescenta, Calif.

[73] Assignee: Gentex Corporation, Zeeland, Mich.

[21] Appl. No.: 09/002,400

[22] Filed: Dec. 31, 1997

[51] Int. Cl.$^6$ ..................................................... H04N 5/335
[52] U.S. Cl. ........................ 250/208.1; 348/307; 377/60
[58] Field of Search .............................. 250/208.1, 214.1; 257/239, 292, 294, 369–371; 348/230, 294, 297, 298, 154, 155, 300, 301, 307–309, 311, 312, 316, 317, 319–323; 377/60–63

[56] References Cited

U.S. PATENT DOCUMENTS

| | | |
|---|---|---|
| 4,647,975 | 3/1987 | Alston et al. . |
| 5,060,075 | 10/1991 | Skinner . |
| 5,194,957 | 3/1993 | Kyuma . |
| 5,387,958 | 2/1995 | Pashley . |
| 5,471,515 | 11/1995 | Fossum et al. . |
| 5,534,920 | 7/1996 | Kim . |
| 5,631,704 | 5/1997 | Dickinson et al. . |
| 5,640,028 | 6/1997 | Kawamoto et al. ........................ 377/63 |
| 5,721,425 | 2/1998 | Merrill ................................. 250/214.1 |
| 5,898,168 | 4/1999 | Gowda et al. ........................... 348/311 |

FOREIGN PATENT DOCUMENTS

| | | |
|---|---|---|
| 0 087 992 | 9/1983 | European Pat. Off. . |
| 0 244 230 | 4/1987 | European Pat. Off. . |
| 0 417 397 | 3/1991 | European Pat. Off. . |
| 0 417 397 A1 | 3/1991 | European Pat. Off. . |
| 0 573 235 A1 | 8/1993 | European Pat. Off. . |
| 40 15 927 | 11/1990 | Germany . |
| 7-075022 | 3/1995 | Japan . |
| 2 313 973 | 6/1996 | United Kingdom . |
| WO 97/17800 | 11/1996 | WIPO . |
| WO 96/38319 | 12/1996 | WIPO . |
| WO/97 42756 | 11/1997 | WIPO . |

OTHER PUBLICATIONS

"Image Sensors with Individual Pixel Reset", Orly Yadid–Pecht et al., NASA Tech Briefs, Nov. 1996, p. 34.

"Low Power Camera–on–a–Chip Using CMOS Active Pixel Sensor Technology", Eric R. Fossum, 1995 Symposium on Low Power Electronics, Oct. 9–10, 1995, San Jose, CA.; pp. 1–4.

"Active Pixel Sensors: Are CCDs Dinosaurs", Eric Fossum, 2/SPIE vol. 1900 pp. 2–14.

"Low–Light Level Image Sensor with on–Chip Signal Processing", Dunetra K. Mendis et al. SPIE vol. 1952, pp. 23=33.

"Readout Schemes to Increase Dynamic Range of Image Sensors", Orly Yadid–Pecht and Eric R. Fossum, NASA Tech Briefs, Jan. 1997, pp. 32–33.

Primary Examiner—Stephone Allen
Attorney, Agent, or Firm—Brooks & Kushman P.C.

[57] ABSTRACT

A system and method is described for increasing effective integration time of an optical sensor including holding a first signal within each pixel cell, proportional to light integrated by the pixel cell over the previous frame period, generating a second signal within each pixel cell proportional to light integrated by the pixel cell over the current frame period, and summing the first signal and the second signal from each pixel, thereby producing an output signal representing the light integrated by each pixel over two frame periods. If saturation of pixel cells is possible, a further method of extending dynamic range is described including generating and storing a first signal in each pixel cell indicative of light integrated by the pixel cell over a long period, generating a second signal in each pixel cell indicative of light integrated by the pixel cell over a short period, and determining an output for each pixel as the first signal whenever the first signal is less than a threshold value, otherwise determining the output as the second signal. Also included are double correlated sampling for noise reduction, interlacing for increased integration time, and individual pixel reset for additional gains in dynamic range.

23 Claims, 6 Drawing Sheets

WIDE DYNAMIC RANGE OPTICAL SENSOR

TECHNICAL FIELD

The present invention relates in general to optical sensors and in particular to CMOS photogate active pixel sensor array optical sensors with wide dynamic range.

BACKGROUND ART

Optical sensors find a variety of uses, including satellite attitude sensors, video cameras and security systems. Many of these applications, such as a vehicle viewing system, are required to operate over an extensive range of conditions. For example, a wide intra-scene brightness range allows for viewing dimly lit night scenes even in the presence of glare from headlamps. A wide inter-scene brightness range allows for viewing scenes illuminated by bright sunlight as well as moonlight. Still further, frame rates must allow for displayed scenes to appear real-time.

Charge-coupled devices (CCDs) have often been the technology of choice. A CCD optical sensor operates as an analog shift register, passing charge developed in proportion to light incident on a pixel across adjacent pixels until the charge reaches an end pixel where it is processed. However cost, read-out rate limitations, requirements for high and multiple voltage levels, and support electronics integration incompatibilities have prohibited large-scale adaptation of CCDs into certain applications such as vehicle viewing systems.

Unlike CCDs, active pixel sensors (APSs) utilize at least one active element within each pixel to accomplish amplification, pixel selection, charge storage or a similar benefit. As such, APS devices have many of the benefits of CCDs including high sensitivity, high signal fidelity and large array formats. Because APS cells are accessed in a row-wise manner, the problems arising from transferring charge across pixel cells, as is done in CCD sensors, are alleviated. Additional comparisons between APS cells and other devices are presented in, for example, "Active Pixel Sensors: Are CCD's Dinosaurs?" in Proceedings of SPIE: Charge-Coupled Devices and Solid State Optical Sensors III, Vol. 30, pp. 2–14 (1993) by E. R. Fossum, which is hereby incorporated by reference.

One form of APS utilizes a photodiode p-n junction and a source-follower buffer in each pixel. However, photodiode devices typically suffer from high kTC, 1/f and fixed pattern noise, thereby limiting dynamic range.

An alternative APS design uses a metal-on-silicon (MOS) photogate to accumulate charge proportional to light incident during an integration period. The charge can be shifted to a sensing region for readout. The sensing region can also be reset, allowing a reference output indicative of noise levels. The reference can be subtracted from the integrated light value to implement correlated double sampling.

A photogate device presents several benefits. A first benefit is that photogates have a very low noise level compared to other devices such as photodiodes. This results in the need for less integration time to achieve a desired light sensitivity. A second benefit is that the photogate APS is compatible with standard CMOS manufacturing methods. This allows an APS array together with control and processing circuitry to be built on the same integrated circuit chip.

In order to accommodate wide intra-scene and inter-scene brightness levels, an increased dynamic range is required. This can be accomplished by increasing the integration time used by each pixel cell in the optical sensor. Traditionally, integration time has meant a corresponding increase in frame time. Since frame time determines the rate at which the output image is updated, increasing frame time may result in output images that no longer appear real-time.

SUMMARY OF THE INVENTION

It is a primary object of the present invention to provide a system and method for increasing the dynamic range of optical sensors while maintaining a near real-time frame rate.

Another object of the present invention is to provide a system and method for viewing details in scenes that may be obscured due to dim lighting or masked by bright light sources.

Still another object of the present invention is to provide a system and method for viewing scenes with wide inter-scene brightness levels.

A further object of the present invention is to provide a system and method for viewing scenes with wide intra-scene brightness levels.

A still further object is to describe a collection of possibly coexisting architectures for increased dynamic range optical sensors.

In carrying out the above objects and other objects and features of the present invention, a method is provided for increasing the effective integration time without a corresponding increase in the frame time.

In one embodiment, each pixel cell holds the charge value corresponding to light accumulated during a previous frame period while integration of incident light is carried out in the current frame period. At the end of the current frame period, both values are read out and summed, and the current value is stored. This double integration method produces in each frame period an output value representative of the incident light over two frame periods, effectively doubling the dynamic range.

In another embodiment, light incident over a long period is held in each pixel cell. The cell then integrates incident light over a short period. Both values are read out and compared. If the long integration value is at or near saturation, the short integration value is used. This dual integration method increases the dynamic range of the pixel cell by a factor roughly equivalent to the ratio of the long integration time to the short integration time.

In still another embodiment, integration time is increased by reading a subset of pixel cells each frame period while cells not read during the current frame period continue to integrate. The values for cells not read in a given frame period can be interpolated. This interlacing method provides a tradeoff between integration time and spacial resolution.

In a further embodiment, individual or groups of pixel cells can be reset at any time, shortening their integration period. This increases dynamic range by allowing a pixel cell sensing a generally dim scene to have a longer integration time than a pixel cell sensing a smaller, brightly lit region.

In the preferred embodiment, double integration, dual integration, interlacing and individual pixel reset are all available and may be selectively used together or separately to provide increased dynamic range over wide inter-scene and intra-scene brightness conditions.

A system is also provided in accordance with the present invention for a wide dynamic range optical sensor. The system includes an array of active pixel sensor cells, one or more decoders for selecting groups of cells, output circuits that accepts output from pixel cells and may perform dynamic range increase operations, noise reduction operations and analog-to-digital conversion, and control circuitry.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
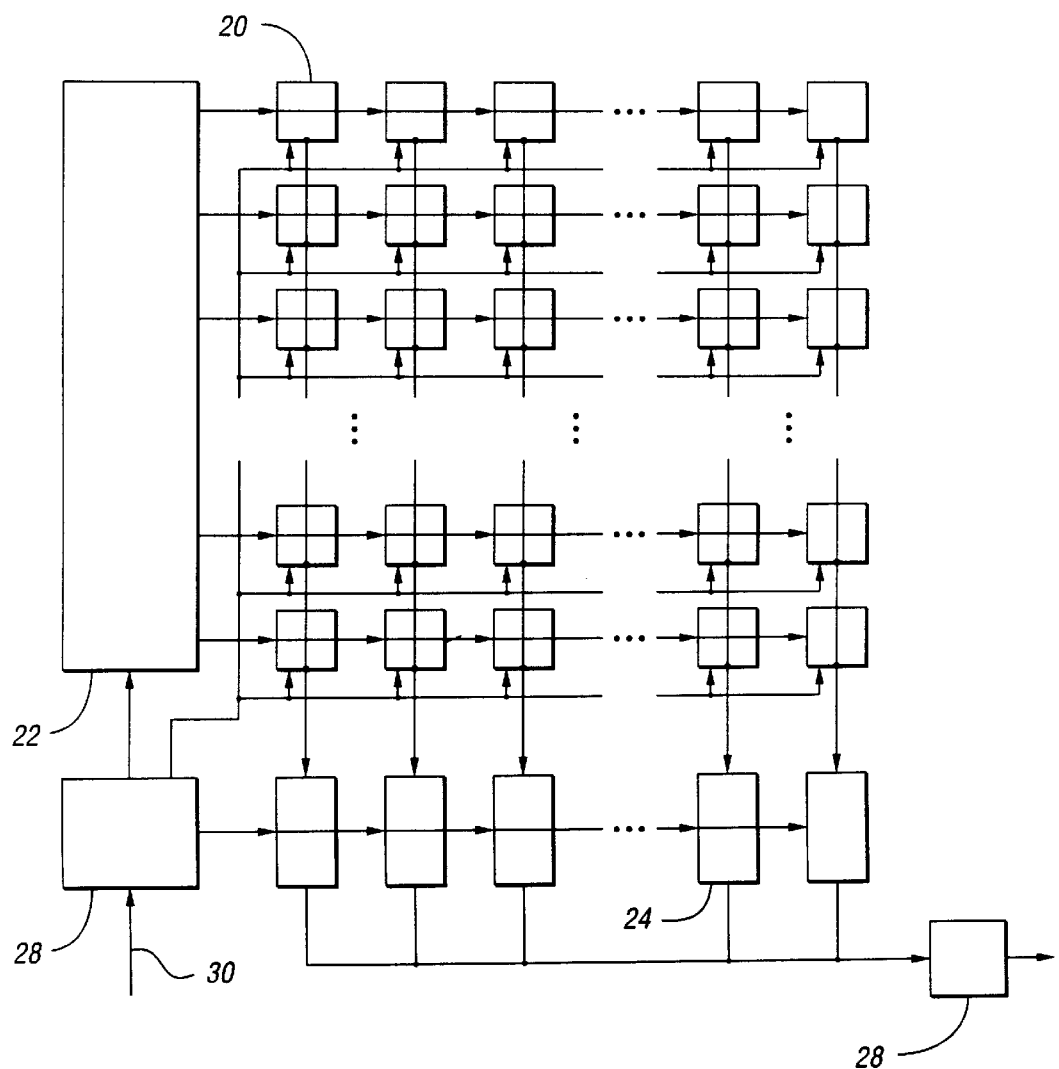
FIG. 1 is a block diagram of an exemplary optical sensor according to the present invention.

Referring now to FIG. 1, a block diagram of an exemplary optical sensor is shown. The optical sensor combines an array of pixel sensors with control and output circuitry.

A plurality of optical pixel sensors, preferably APS cells, are arranged in rows and columns. A typical pixel sensor cell is indicated by 20. Each row of pixel sensors is selected for output by row decoder 22.

Each pixel sensor in a selected row delivers an output signal to a corresponding output circuit 24. Output circuits may condition and combine pixel sensor signals as will be described below with reference to FIGS. 3 and 4. Output circuits may also contain analog-to-digital converters (ADCs) for digitizing output circuit results. ADCs for optical sensors are well known as in, for example, "Low-Light-Level Image Sensor with On-Chip Signal Processing," Proceeding of SPIE, Vol. 1952, pp. 23–33 (1993) by Mendis, Pain, Nixon and Fossum, and which is hereby incorporated by reference.

Output circuits 24 may deliver digitized values to buffer 28 so as to affect a serial or parallel stream of output data. An alternative to placing an ADC in each output circuit 24 is to use a single ADC in buffer 28.

Control of the optical sensor is accomplished through timing controller 26, which sends signals to pixel sensors 20, row decoder 22 and output circuits 24. Timing controller 26 may also receive external control signals 30 indicating, for example, integration times, reset times and types of image sensor architectures in use as are described with regards to FIGS. 3 through 6.

CMOS Photogate APS

Figure 2:
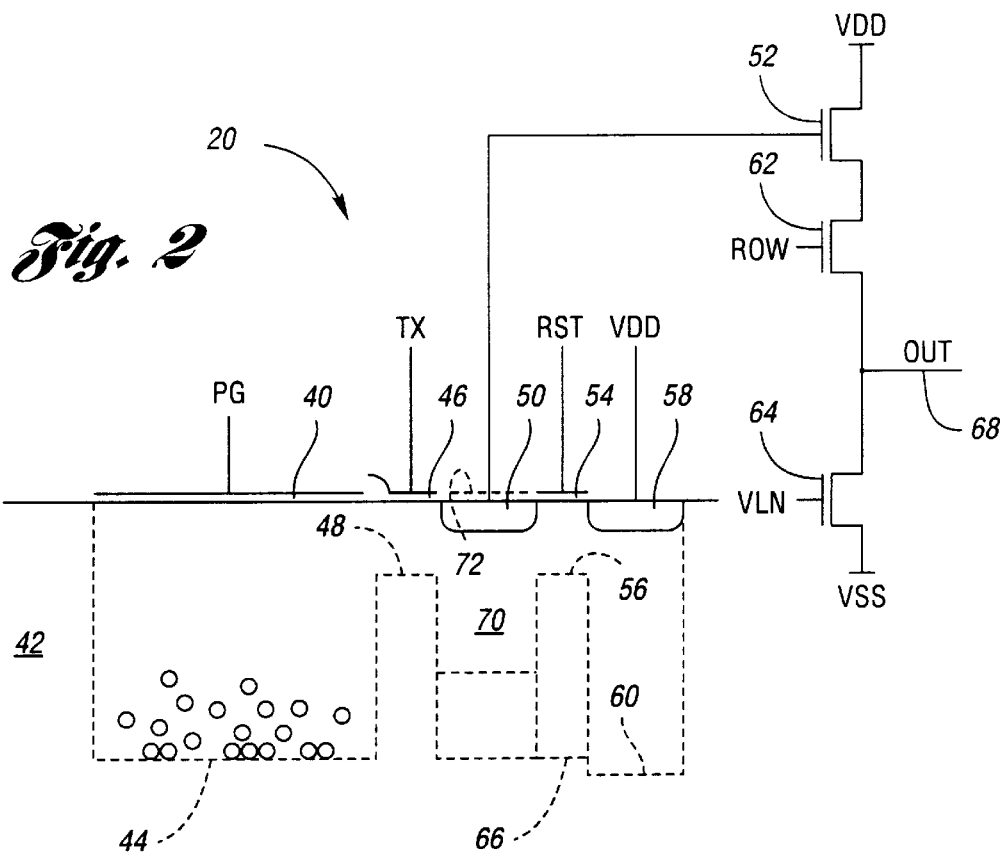
FIG. 2 is a schematic diagram illustrating the operation of a CMOS photogate active pixel sensor.

Referring now to FIG. 2, a CMOS photogate active pixel sensor is shown. A brief description of the APS operation is described forthwith. A more detailed description is in U.S. Pat. No. 5,471,515 entitled "Active Pixel Sensor with Intra-Pixel Charge Transfer" to Fossum, Mendis and Kemeny which is hereby incorporated by reference.

A pixel sensor cell is shown generally by 20. Photogate electrode 40 overlays silicon substrate 42. Photogate signal PG is held at a positive voltage to form potential well 44 in substrate 42. Light incident on photogate 40 generates charge, which is accumulated in well 44 during an integration period. Transfer gate electrode 46 is initially held at a less positive voltage than photogate signal PG, so as to form potential barrier 48 adjacent to well 44. Floating diffusion 50 is connected to the gate of source follower FET 52, whose drain is connected to drain voltage VDD. Reset electrode 54 is initially held by reset signal RST at a voltage corresponding to transfer gate voltage TX to form transfer barrier 56 thereunder. Supply voltage VDD connected to drain diffusion 58 creates a constant potential well 60 beneath diffusion 58. Row select FET 62 presents a voltage at node OUT, referenced as 68, proportional to charge stored under floating diffusion 50 when signal ROW is asserted. A constant voltage is applied by signal VLN at the gate of load FET 64. Load FET 64 may be implemented in each APS cell or one transistor may be used for a column of APS cells. Transistors 52, 62 and 64 form a switched buffer circuit.

The region beneath floating diffusion 50 is reset by temporarily bringing reset electrode 54 to a voltage near VDD so as to create reset potential level 66. Asserting signal ROW causes a reference voltage to appear at OUT 68. This reference voltage can be subtracted from an integrated light readings to limit the effect of kTC and threshold-voltage non-uniformity induced fixed pattern noise, a technique known as correlated double sampling.

At the end of the integration period, electrons in well 44 are transferred by decreasing the photogate voltage PG such that charge is moved from well 44 to beneath floating diffusion 50. This changes the potential level of the floating gate from reset level 66 to level 70 indicative of the charge amount accumulated during the integration period. A voltage proportional to the integrated charge is delivered to node OUT 68 by asserting signal ROW on FET 62.

It should be noted that floating diffusion 50 acts as a charge storage device, and can hold the charge from a previous integration while photogate 40 integrates new charge.

In an alternative embodiment, floating diffusion 50 is replaced by a floating gate shown schematically in FIG. 2 by a simplified dashed line floating gate electrode 72. The basic operation of floating gate electrode 72 is similar to floating diffusion 50.

Double Integration Period Architecture

In order to achieve an output image that appears real-time, at least 30 frames must be generated each second. This implies that, if each pixel cell is to be read each frame, an integration period not greater than 33 milliseconds is required. Double integration sums the charge integrated over two frame periods. For optical sensors that may be used to view dimly lit scenes such as, for example, vehicle viewing systems, an effective integration time of approximately twice the frame rate is achieved while still maintaining a near real-time output.

Figure 3:
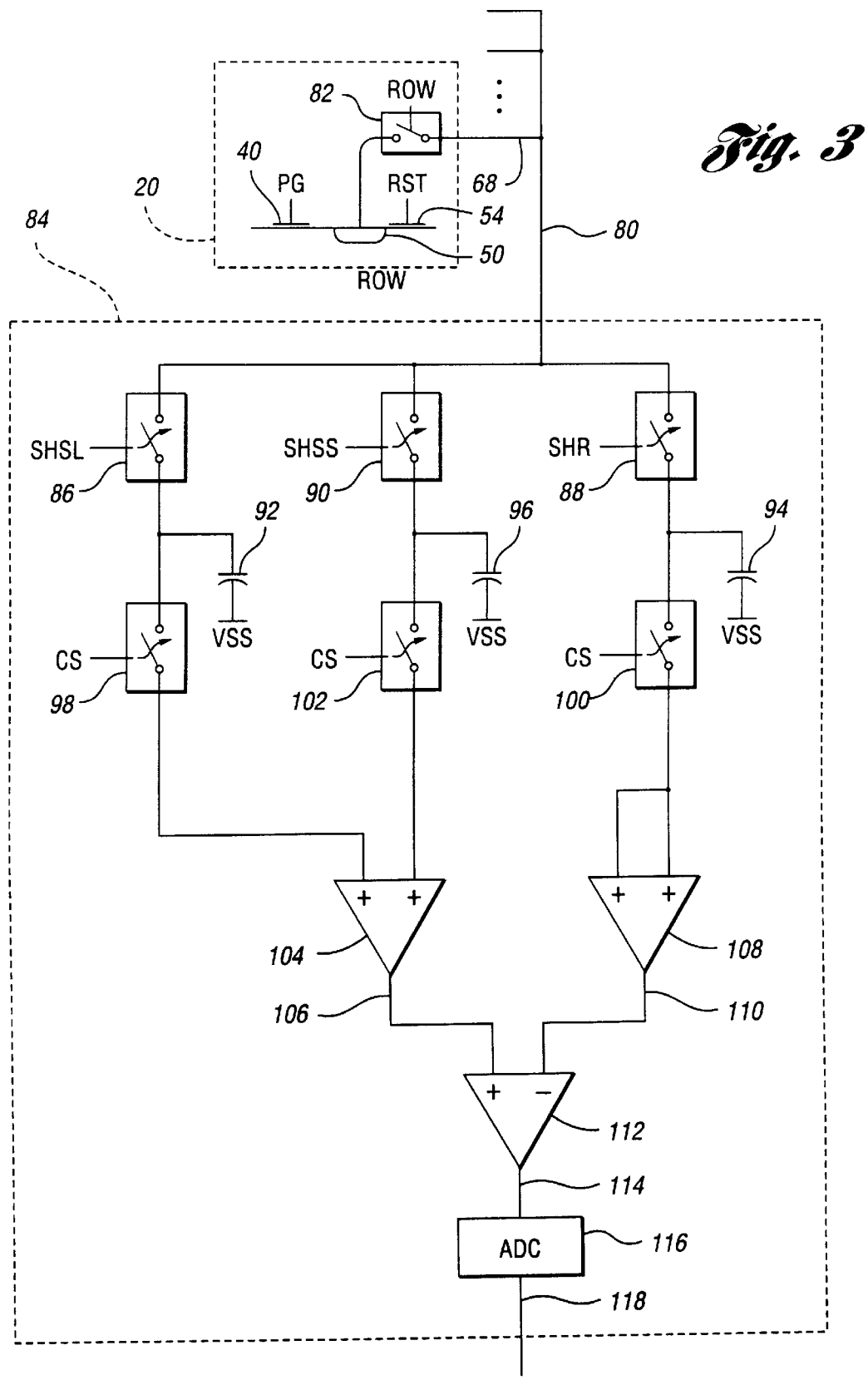
FIG. 3 is a schematic diagram of an optical sensor architecture implementing double integration time according to the present invention.

Referring now to FIG. 3, a schematic diagram for the output circuit for a double integration image sensor is shown. Photogate APS pixel sensors 20 in a given column have output nodes 68 tied together to form column bus 80.

The operation of an APS pixel sensor cell is described with regards to FIG. 2 above. The switched output buffer of FIG. 2 has been replaced by row switch 82 for clarity. Since only one row is selected at any given time, at most one pixel sensor in the column has an output that does not appear as high impedance. Column bus 80 is also connected to double integration output circuit 84.

Within output circuit 84, column bus 80 is connected to the inputs of sample-and-hold signal 1 (SHS1) switch 86, sample-and-hole reset (SHR) switch 88, and sample-and-hold signal 2 (SHS2) switch 90. As is well known in the art, switch 86, 88 or 90 may be implemented with an n-channel FET. When signal SHS1 is asserted, the voltage on bus 80 appears across capacitor 92 connected to the output of switch 86. When signal SHR is asserted, the voltage on bus 80 appears across capacitor 94 connected to the output of switch 88. When signal SHS2 is asserted, the voltage on bus 80 appears across capacitor 96 connected to the output of switch 90. Each of capacitors 92, 94 and 96 are connected to a switched buffer circuit shown as 98, 100 and 102 respectively. Each switched buffer passes the voltage on the capacitor connected to its input when signal CS is asserted. The design of switched buffers is well known in the art.

In operation, each row is selected once per frame period by asserting corresponding signal ROW. When its row is first selected, node output 68 is at a voltage level corresponding to the charge integrated by pixel sensor 20 during the previous frame period. Signal SHS1 is asserted, charging capacitor 92 to the first integration voltage level. Floating diffusion 50 in pixel sensor 20 is reset, and the reset voltage level is placed on node 68. Capacitor 94 is charged to the reset voltage by asserting signal SHR. The charge accumulated by photogate 40 during the current frame period is then transferred to floating diffusion 50 with the corresponding second integration voltage appearing at node 68. Signal SHS2 is then asserted, charging capacitor 96 to the second integration voltage.

When signal CS is asserted, the first integration voltage and the second integration voltage are read by summing circuit 104 producing integrating signal 106 equal to the charge integrated in pixel sensor 20 over two frame periods. Simultaneously, the reset voltage is fed into doubling circuit 108 producing reference signal 110 approximating the kTC noise produced by two samplings of pixel sensor 20. The difference between integrating signal 106 and reference signal 110 is obtained in differencing circuit 112. The output of differencing circuit 112, analog intensity signal 114, is a voltage representative of the light incident on pixel sensor 20 over the previous two frame periods less an estimate of noise over the same time. Analog signal 114 is read by ADC 116 to produce digital intensity signal 118.

Output circuit 84 produces, in each frame period and for each pixel sensor 20 in the corresponding column, a value representing the light incident on pixel sensor 20 over two frame periods, effectively doubling the dynamic range of pixel sensor 20. By adding additional floating diffusions and select logic to each pixel sensor 20 as well as capacitors and support circuitry to output circuits 84, further dynamic range may be gained.

Dual Integration Time Architecture

An optical sensor sensing a scene with a wide dynamic range may sacrifice saturation of pixel sensors viewing brightly lit regions in order to achieve sufficient detail in dimly lit regions. Such problems occur in, for example, vehicle rear viewing systems where a well lit street may wash out details from an adjacent sidewalk. This problem is minimized by integrating each pixel cell over two periods of different lengths, and using the short integration value if the long integration value is saturated. Dual integration may also reduce the number of bits required in analog-to-digital conversion.

Figure 4:
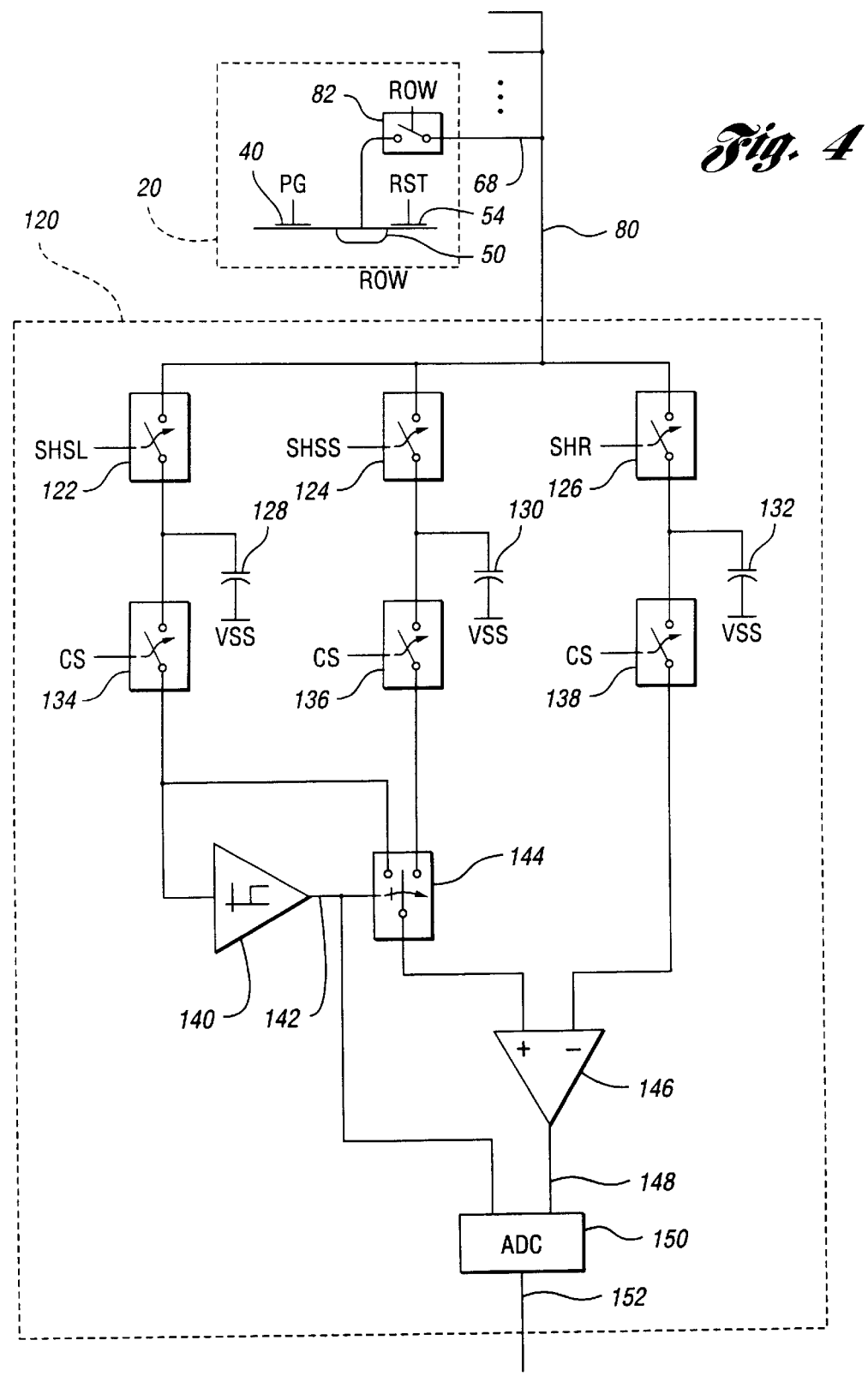
FIG. 4 is a schematic diagram of an optical sensor architecture implementing dual integration times according to the present invention.

Referring now to FIG. 4, a schematic diagram for implementing dual integration times is shown. Pixel sensors 20 in a given column have output nodes 68 tied together to form column bus 80. The operation of an APS pixel sensor cell is described with regards to FIG. 2 above. Since only one row is selected at any given time, at most one pixel sensor in the column has an output that does not appear as high impedance. Column bus 80 is also connected to dual integration output circuit 120.

Within output circuit 120, column bus 80 is connected to sample-and-hold signal long (SHSL)switch 122, sample-and-hold signal short (SHSS) switch 124, and sample-and-hold reset (SHR) switch 126. When signal SHSL is asserted, the voltage on bus 80 appears across capacitor 128 connected to the output of switch 122. When signal SHSS is asserted, the voltage on bus 80 appears across capacitor 130 connected to the output of switch 124. When signal SHR is asserted, the voltage on bus 80 appears across capacitor 132 connected to the output of switch 126. Each of capacitors 128, 130, and 132 is connected to its own switched buffer circuit, shown as 134, 136 and 138 respectively. Each switched buffer passes the voltage on the capacitor connected to its input when signal CS is asserted. The design of switched buffers is well known in the art.

During each frame period, photogate 40 accumulates charge for a long period then transfers the charge to floating diffusion 50 where it is stored. Photogate 40 then integrates for a short period. In one embodiment, the long and short periods are such that their sum is not greater than the frame period. At the end of the frame period, ROW is asserted at switch buffer 82 and the voltage at node output 68 becomes a value corresponding to the charge integrated by pixel sensor 20 during the long integration period. Signal SHSL is asserted, charging capacitor 128 to the long integration voltage level. Floating diffusion 50 in pixel sensor 20 is reset, and the reset voltage level is placed on node 68. Capacitor 132 is charged to the reset voltage by asserting signal SHR. The charge accumulated by photogate 40 during the short integration period is then transferred to floating diffusion 50 with the corresponding short integration voltage appearing at node 68. Signal SHSS is then asserted, charging capacitor 130 to the short integration voltage.

Signal CS is then asserted. The long integration voltage, on capacitor 128, is read by threshold detector 140. Threshold detector output 142 is asserted when the long integration voltage is at or near a level indicating saturation of pixel sensor 20 during the long integration period. Threshold detector output 142 controls select switch 144 which routes to its output either the long integration voltage signal or the short integration voltage signal. In this way, if pixel sensor 20 is saturated during a long integration period, the value over a shorter period is used. The reset voltage, representative of kTC noise, is subtracted from the selected long or short integration signal in difference circuit 146, producing analog signal 148. Analog signal 148 is converted to a digital signal by ADC 150. Threshold bit 142 may be included with the digital signal to produce output 152.

An alternative embodiment for implementing dual integration times uses 2 m output circuits. As in a conventional system, the m pixel sensors in each row are read then reset, once per frame period, into m outputs. Each row is also read at some time prior to the next frame period into a second set of m outputs to implement the short integration time. Control is simplified by reading the row completing the long integration time and the row completing the short integration time simultaneously into two sets of output circuits. This embodiment is further described in "Readout Schemes to Increase Dynamic Ranges of Image Sensors," NASA Tech Briefs, pp. 32–33 (January 1997) by Yadid-Pecht and Fossum, which is hereby incorporated by reference.

An ideal ratio between the long and short integration times is about -to-1. This would extend the dynamic range by about a factor of ten, providing good resolution for dimly lit scenes as well as increasing the brightness range before pixel sensor saturation. Ratios of 8-to-1 or 16-to-1 are desirable due to the ease of implementing powers of two in digital circuits.

INTERLACING INTEGRATION ARCHITECTURE

Another technique for extending the effective integration time beyond the frame time is through interlacing. A subset of pixel cells are read and reset each frame period, the remaining cells continue to integrate light-induced charge. Image values corresponding to pixel cells not read during a particular frame may be interpolated.

Figure 5A:
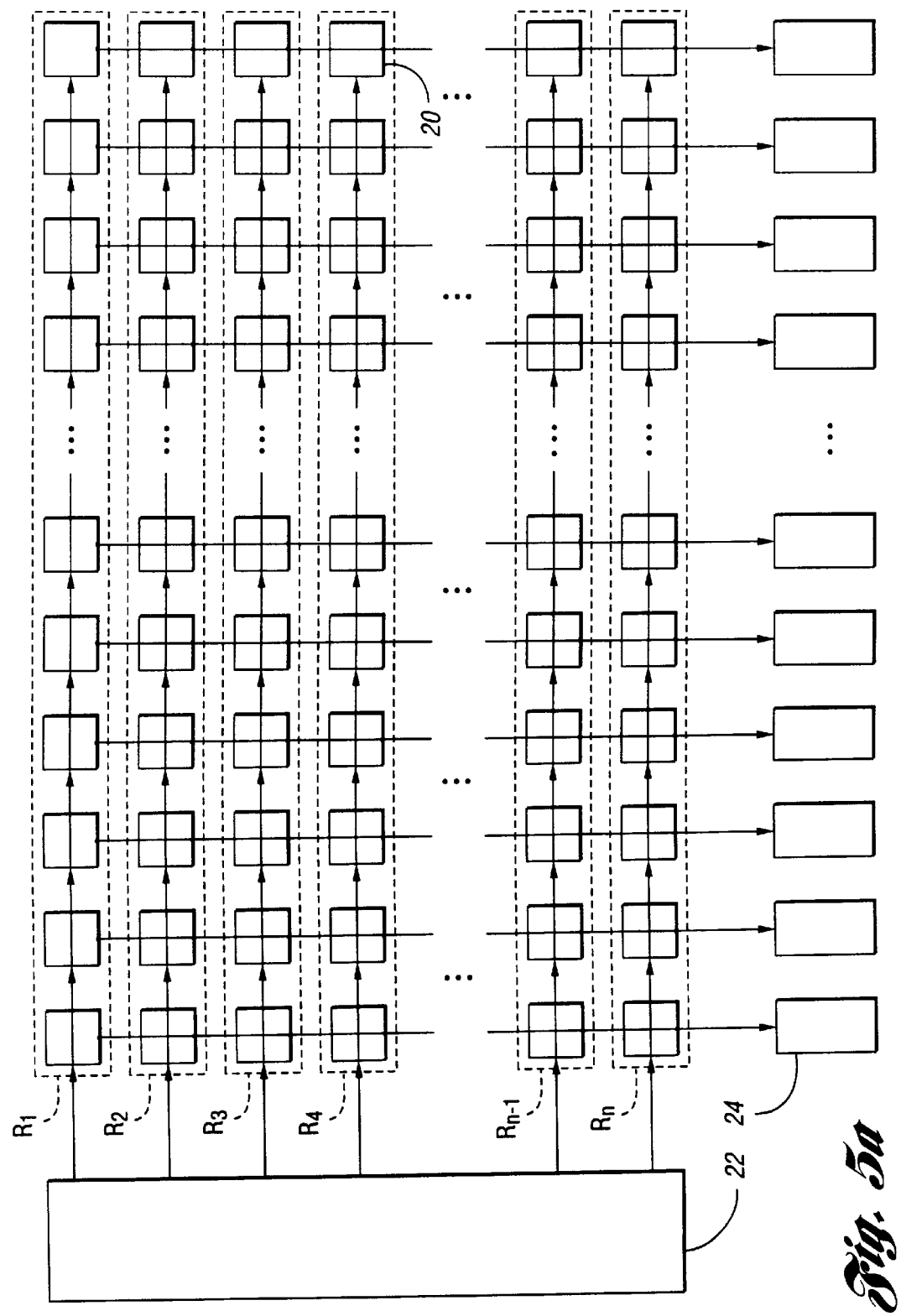
FIG. 5a is a block diagram of an optical sensor architecture implementing row-wise interlacing according to the present invention.

Referring now to FIG. 5a, an interlacing technique for extending dynamic range is shown. An m by n array of pixel sensors 20 are arranged into successive rows $R_1, R_2, R_3, \ldots, R_n$ where n is the number of rows. Even numbered rows are placed in a first set and odd numbered rows in a second set. Row decoder 22 is used to select the row of pixel sensors providing signals to m output circuits 24. Row decoder 22 sequentially selects all rows in the first set within one frame period followed by all rows in the second set within the next frame period, thereby implementing the sequence $R_1, R_3, \ldots, R_{n-1}, R_2, R_4, \ldots, R_n$, over two frame periods. This allows each pixel sensor to integrate incident light for two frame periods, effectively doubling the integration time per frame period.

Using the above method with a frame period of 33 milliseconds produces a new frame each 33 milliseconds with half of the pixels (all pixels in half of the rows) of the output image being updated each frame. The values in the remaining half of the pixels in each frame may be interpolated from the new values.

Figure 5B:
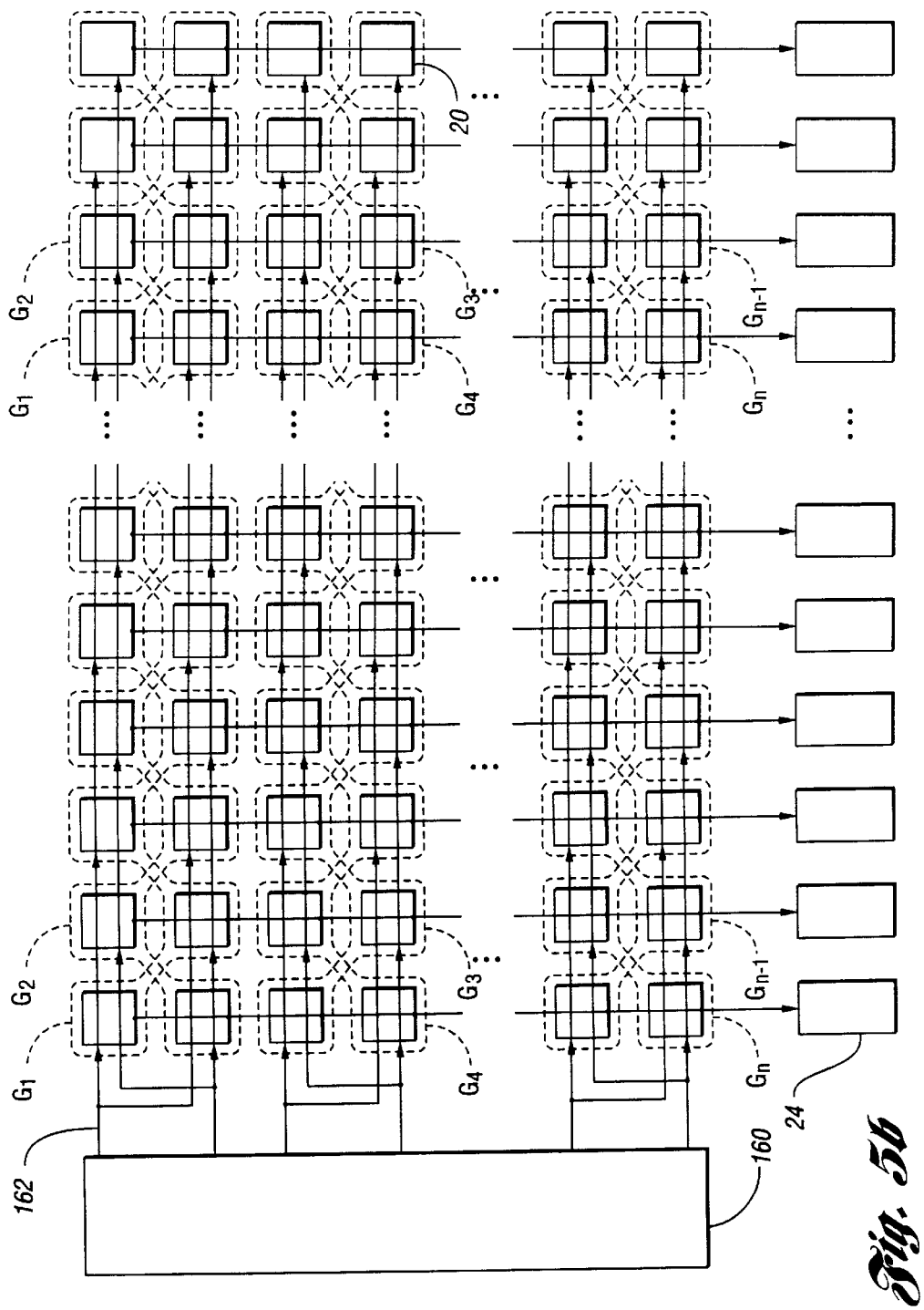
FIG. 5b is a block diagram of an optical sensor architecture implementing group-wise interlacing according to the present invention.

Referring now to FIG. 5b, a more general embodiment of the interlacing architecture is shown. Pixel sensors 20 are further arranged into groups $G_1, G_2, G_3, \ldots, G_n$, where n is the number of groups and the product of m and n is the total number of pixel sensors. In FIG. 5b, each group is an alternate pixel in two adjacent rows so as to form a checkerboard-like pattern within the two rows. Group decoder 160 is used to simultaneously select all pixel sensors in a group. For example, select line 162 activates each of the shaded pixels sensors in FIG. 5b. Pixel sensors 20 are connected to output circuits 24 such that, regardless of which group is selected, at most one activated pixel cell is connected to each output circuit.

Groups may be placed into one or more sets. The groups in each set may be alternately selected during one frame period, then the groups in a different set during the next frame period, and so on until all groups are selected. The process is then repeated. For example, if four sets are used, each group $G_i$ can be placed into set i=$G_i$ modulo 4 for i=0 . . . 3. The sequence for asserting the groups would then be $G_1, G_5, \ldots, G_{n-3}, G_2, G_6, \ldots, G_{n-2}, G_3, G_7, \ldots, G_{n-1}, G_4, G_8, \ldots, G_n$ over a span of four frame periods. This results in an integration period of approximately four times the frame period, resulting in four times the dynamic range if appropriate output electronics are used.

As with row groupings, each set can be read out in one frame period. Prior to display, image pixel values not updated from pixel sensors in a given frame can be interpolated from previous values, from other pixel values, or both. For example, with the arrangement shown in FIG. 5b, even-numbered groups may be placed in one set and odd-numbered groups in another set. Image pixel values not updated from pixel sensors may be obtained by averaging adjacent neighbor pixel values.

It is appreciated that many different grouping patterns and numbers of sets may be used within the spirit of the present invention.

Individual Pixel Reset Architecture

Optical sensors in some applications view scenes with small regions of intense brightness compared to the remainder of the scene. This may occur, for example, from headlamps sensed by vehicle vision systems. Once these regions are detected, the integration time for the corresponding pixel cells may be reduced by resetting the accumulated charge.

Figure 6:
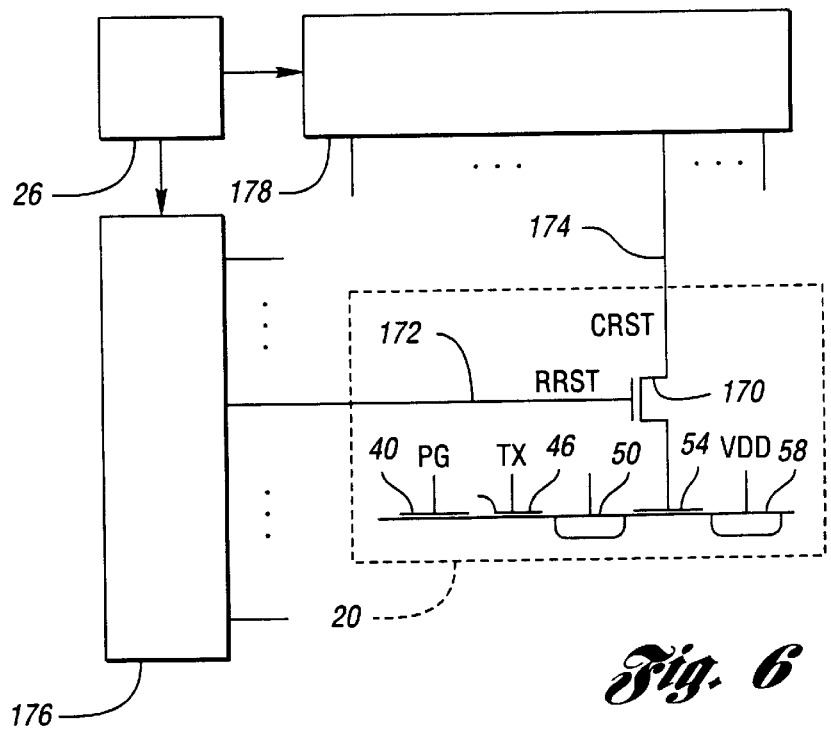
FIG. 6 is a schematic diagram of an optical sensor architecture implementing individual pixel reset according to the present invention.

Referring now to FIG. 6, an individual pixel reset architecture for extending dynamic range of an optical sensor is shown. Individual or groups of pixel sensors can be reset during integration time, thereby providing a shorter integration period. Areas of the image which are dimly lit receive longer integration periods than areas which are brightly lit. A method of controlling the reset period for a pixel sensor is described in "Image Sensors With Individual Pixel Reset," pg. 34 of NASA Tech Brief NPO-1973 of November 1996 by Pecht, Pain and Fossum and hereby incorporated by reference.

FIG. 6 shows an APS pixel cell, described with reference to FIG. 2 above, with the addition of reset FET 170. In each pixel sensor cell 20, floating diffusion 50 is set to a reference level when reset electrode 54 is asserted as described with respect to FIG. 2. Reset FET 170 has its source connected to reset electrode 54, gate connected to row reset signal (RRST) 172, and drain connected to column reset signal (CRST) 174. When both RRST and CRST are asserted, floating diffusion 50 is reset.

In one embodiment, shown in FIG. 6, all pixel sensor cell in each row are connected to a common RRST line and all pixel sensor cells in one column are connected to a common CRST line. A row reset decoder 176 selectively asserts a row based on signals from timing controller 26. A column reset decoder 178 selectively asserts a row based on signals from timing controller 26.

In an alternative embodiment, collections of pixels sensor cells are reset simultaneously by the same combination of row and column reset signals. This exchanges reset spacial resolution for simplified control. Possible arrangements for collections of pixels include, but are not limited to, n-by-n arrays for n=2, 3, 4, . . . .

An optical sensor system capable of providing an image of a scene with increased dynamic range while still maintaining a near real-time frame rate and while operating under wide inter-scene and intra-scene brightness has been presented. While the best modes for carrying out the invention has been described in detail, those familiar with the art to which this invention relates will recognize various alternative designs and embodiments for practicing the invention as defined by the following claims.

What is claimed is:

1. A method for increasing dynamic range for an optical sensor, the optical sensor having frame period and the optical sensor including a plurality of pixel cells, the method comprising:

storing a first signal within each pixel cell, the first signal proportional to light integrated by the pixel cell over the previous frame period;

generating a second signal within each pixel cell, the second signal proportional to light integrated by the pixel cell over the current frame period;

generating an output signal as the sum of signals from each pixel cell; and storing within each pixel cell the second signal, whereby in the next application of the method the stored second signal is operative as the first signal and a new second signal is generated.

2. A method for increasing dynamic range of an optical sensor as in claim 1, further comprising:

obtaining a noise signal from each pixel cell;

doubling the noise signal; and subtracting the doubled noise signal from the third summed signal, thereby producing an output signal with reduced noise.

3. A method for increasing dynamic range of an optical sensor as in claim 1, wherein the output signal for each pixel cell is determined once each frame period.

4. A method for increasing dynamic range of an optical sensor as in claim 1, wherein each pixel cell belongs to at least one of a plurality of groups and each group belongs to at least one of a number of sets, the method further comprising:

determining a group for each pixel cell and a set for each group;

selecting a first set;

selecting a first group within the first set;

determining the output signal for each pixel cell in the first group in the first set;

determining the output signal for each pixel cell in each remaining group in the first set within a frame period;

proceeding through the groups in each of the number of sets in a sequence; and repeating the sequence of sets such that the output signal for each pixel cell is produced once in a time period found as the product of the frame time and the number of sets.

5. A method for increasing dynamic range of an optical sensor as in claim 4, wherein each pixel cell is in a sequentially numbered row, the step of determining a group for each pixel cell and a set for each group comprising:

assigning each pixel cell to a group corresponding to a sequentially numbered row;

assigning each group corresponding to an even numbered row to a first set; and assigning each group corresponding to an odd numbered row to a second set.

6. A method for increasing dynamic range of an optical sensor as in claim 4, wherein each pixel cell is in a sequentially numbered row, the step of determining a group for each pixel cell and a set for each group comprising:

assigning pixel cells in two adjacent rows to an even numbered group such that the pattern of pixels forms a "checkerboard", the group of pixel cells including the left-most pixel cell of the top row of the row pair;

assigning pixel cells in two adjacent rows to an odd numbered group such that the pattern of pixels forms a "checkerboard", the group of pixel cells including the second left-most pixel cell of the top row of the row pair;

assigning each even numbered group to a first set; and assigning each odd numbered group to a second set.

7. A method for increasing dynamic range of an optical sensor as in claim 1, wherein the optical sensor has an integration time generally applied to all pixel cells and wherein each pixel cell can be individually reset, the method further comprising:

determining if each pixel sensor requires less integration time than the general integration time;

determining a shortened integration time for each pixel sensor requiring less than the general integration time; and resetting each sensor pixel at a time so that the time remaining prior to producing an output signal approximates the desired shortened integration time.

8. A method for increasing dynamic range of an optical sensor, the optical sensor including a plurality of pixel cells, the method comprising:

generating a first signal in each pixel cell indicative of light integrated by the pixel cell over a first period;

storing the first signal in the pixel cell;

generating a second signal in each pixel cell indicative of light integrated by the pixel cell over a second integration period shorter than the first integration period;

comparing the first signal to a predetermined threshold value;

generating an output signal corresponding to the first signal if the first signal does not exceed the threshold value; and generating an output signal corresponding to the second signal if the first signal exceeds the threshold value.

9. A method for increasing dynamic range of an optical sensor as in claim 8, the optical sensor having a frame period, wherein the sum of the first and second integration periods is not greater than the frame period.

10. A method for increasing dynamic range of an optical sensor as in claim 8 further comprising:

obtaining a noise signal from each pixel cell; and subtracting the noise signal from the output signal, thereby producing a reduced noise output signal.

11. A method for increasing dynamic range of an optical sensor as in claim 8, wherein each pixel cell belongs to at least one of a plurality of groups and each group belongs to at least one of a number of sets, the method further comprising:

determining a group for each pixel cell and a set for each group;

selecting a first set;

selecting a first group within the first set;

determining the output signal for each pixel cell in the first group in the first set;

determining the output signal for each pixel cell in each remaining group in the first set within a frame period;

proceeding through the groups in each of the number of sets in a sequence; and repeating the sequence of sets such that the output signal for each pixel cell is produced once in a time period found as the product of the frame time and the number of sets.

12. A method for increasing dynamic range of an optical sensor as in claim 11, wherein each pixel cell is in a sequentially numbered row, the step of determining a group for each pixel cell and a set for each group comprising:

assigning each pixel cell to a group corresponding to a sequentially numbered row;

assigning each group corresponding to an even numbered row to a first set; and assigning each group corresponding to an odd numbered row to a second set.

13. A method for increasing dynamic range of an optical sensor as in claim 11, wherein each pixel cell is in a sequentially numbered row, the step of determining a group for each pixel cell and a set for each group comprising:

assigning pixel cells in two adjacent rows to an even numbered group such that the pattern of pixels forms a "checkerboard", the group of pixel cells including the left-most pixel cell of the top row of the row pair;

assigning pixel cells in two adjacent rows to an odd numbered group such that the pattern of pixels forms a "checkerboard", the group of pixel cells including the second left-most pixel cell of the top row of the row pair;

assigning each even numbered group to a first set; and assigning each odd numbered group to a second set.

14. A method for increasing dynamic range of an optical sensor as in claim 8, wherein the optical sensor has an integration time generally applied to all pixel cells and wherein each pixel cell can be individually reset, the method further comprising:

determining if each pixel sensor requires less integration time than the general integration time;

determining a shortened integration time for each pixel sensor requiring less than the general integration time; and resetting each sensor pixel at a time so that the time remaining prior to producing an output signal approximates the desired shortened integration time.

15. An optical sensor producing an image of a scene once per frame period, the optical sensor comprising:

a plurality of pixel sensors disposed in an array of rows and columns, each of the pixel sensors operable to generate a signal in proportion to incident light, store the signal, reset the signal to a reference level, and buffer the signal from other signals generated external to the pixel sensor;

a plurality of output circuits, each output circuit in communication with the pixel sensors in a column and in communication with the optical sensor output;

a row decoder having a plurality of control lines, each of the control lines in communication with the pixel sensors in a respective row; and a timing controller in communication with the plurality of pixel sensors, the row decoder and the plurality of output circuits;

wherein each output circuit is operable to sum the buffered signal representing light incident on a pixel sensor during a previous frame period and the buffered signal representing light incident on the same pixel sensor during the current frame period.

16. An optical sensor as in claim 15, wherein the timing controller is operative to select each row and for each pixel in a selected row to (a) route the signal representing the light incident during the previous frame period to a respective output circuit, (b) store the signal representing the light integrated during the current frame period, (c) route the signal representing the light incident during the current frame period to the respective output circuit, (d) reset each pixel sensor so as to achieve the proper incident light time up to one frame period, and (e) sequentially route the results of each output circuit to the corresponding optical sensor output.

17. An optical sensor comprising:

a plurality of pixel sensors, each pixel sensor disposed in one or more of a collection of groups, and each group disposed in one or more of a collection of sets, each pixel sensor operable to generate a signal in proportion to incident light, reset the signal to a reference level, and buffer the signal from other signals generated external to the pixel sensor;

a plurality of output circuits, each output circuit in communication with a unique pixel sensor in each group and in communication with the optical sensor output, wherein each output circuit is operable to deliver the buffered signal representing light incident on a pixel sensor;

a group decoder having a plurality of control lines, each of the control lines in communication with the pixel sensors in a respective group; and a timing controller in communication with the plurality of pixel sensors, the group decoder and the plurality of output circuits.

18. An optical sensor as in claim 17, wherein each group is a row and wherein the plurality of sets of groups comprises:

a first set of even numbered rows; and a second set of odd numbered rows.

19. An optical sensor comprising:

a plurality of active pixel sensors arranged into an array of rows and columns;

a row decoder having a plurality of control lines connected to the pixel sensor array, each control line being connected to the pixel sensors in a respective column, wherein the row decoder is operable to activate the pixel sensors in a row;

a plurality of doubling circuits, each doubling circuit in communication with the respective pixel sensors in a column;

a plurality of summing output circuits, each summing circuit in communication with the respective pixel sensors in a column;

a plurality of differencing circuits, each differencing circuit in communication with the respective doubling circuit in a column and the respective summing circuit in the column; and a timing controller in communication with each pixel sensor, the row decoder, each doubling circuit, each summing circuit, and each differencing circuit.

20. An optical sensor as in claim 19, wherein each of the plurality of active pixel sensors is operable to integrate charge in proportion to incident light, transfer the integrated charge to storage, reset the charge in storage to a reference level indicative of pixel sensor noise, and present a voltage representative of the charge in storage.

21. An optical sensor as in claim 19, wherein each doubling circuit is operable to store a reference voltage representative of the reference charge, and produce a reference signal proportional to twice the reference voltage.

22. An optical sensor as in claim 19, wherein each summing circuit is operable to store a first integration voltage representative of charge integrated previous to a reset, store a second integration voltage representative of charge generated subsequent to a reset, and produce an integrating signal proportional to the sum of the first integration voltage and the second integration voltage.

23. An optical sensor as in claim 19, wherein each differencing circuit is operable to produce the difference between the integrating signal and the reference signal.

* * * * *